United States Patent [19]

Matsuo et al.

[11] Patent Number: 4,613,805
[45] Date of Patent: Sep. 23, 1986

[54] CONVEYOR SYSTEM

[75] Inventors: Yukito Matsuo; Masuo Tamada, both of Yokohama; Takashi Sawafuji; Teruo Azukizawa, both of Tokyo, all of Japan

[73] Assignee: Kabushiki Kaisha Toshiba, Kawasaki, Japan

[21] Appl. No.: 726,775

[22] Filed: Apr. 24, 1985

[30] Foreign Application Priority Data

Apr. 26, 1984 [JP] Japan ............................ 59-85969

[51] Int. Cl.⁴ .................................................. G05B 11/00
[52] U.S. Cl. ........................................ 318/687; 318/38; 318/135; 318/440; 104/292; 307/64
[58] Field of Search ............... 318/687, 38, 106, 440, 318/442, 135; 104/292; 307/64, 68

[56] References Cited

U.S. PATENT DOCUMENTS

| | | | |
|---|---|---|---|
| 3,356,041 | 12/1967 | Bliss | 318/38 X |
| 3,562,612 | 2/1971 | Munson | 318/106 |
| 3,675,585 | 7/1972 | Wiart et al. | 318/38 X |
| 3,904,942 | 9/1975 | Holtz | 318/687 X |
| 4,404,671 | 9/1983 | Ikeda et al. | 318/687 X |

FOREIGN PATENT DOCUMENTS

0053427 4/1980 Japan .................................. 318/135
59-34541 9/1984 Japan .

Primary Examiner—B. Dobeck
Attorney, Agent, or Firm—Schwartz, Jeffery, Schwaab, Mack, Blumenthal & Evans

[57] ABSTRACT

A plurality of spaced drive means are disposed along a conveyance path for running a carriage along the conveyance path by a forward or reverse propelling force created by the drive means. A main power source and an auxiliary power source are provided for switching a power source from the main power source to the auxiliary power source when the former becomes faulty for running and stopping the carriage at a selected one of the drive means for the purposes of preventing the carriage from stopping at an intermediate point between adjacent drive means.

17 Claims, 13 Drawing Figures

CONVEYOR SYSTEM

BACKGROUND OF THE INVENTION

1. Field of the Invention

This invention relates to a conveying system wherein a plurality of drive means spaced by a predetermined distance are arranged along a path of conveyance for running a carriage by the forward propelling force and reverse propelling force imparted by the plurality of the drive means, and more particularly a restoring system for restoring a power source for supplying operating energy to the drive means when the power source becomes faulty.

2. Description of the Prior Art

Generally, in a conventional article or good conveyor system, the carriage contains drive means for running the carriage along the predetermined conveying path. With such conveying system, however, installation of drive means increases the size and weight of the carriage.

In stead of providing drive means in the carriage conveyor, a conveyor system has been used in which a propelling force is applied from outside to the carriage. As an example thereof may be mentioned a conveyor system utilizing a linear induction motor. In the conveyor system utilizing the linear induction motor, a reaction plate is provided for the carriage and a plurality of uniformly spaced stators acting as propelling force imparting means are disposed along the conveyance path. When the stators are energized from a power supply source, magnetic flux which varies with time is applied to the reaction plate for causing it to generate a forward propelling force or a reverse propelling force to effect starting and stopping of the carriage.

When the power source becomes abnormal, for example interruption of power supply or fault of the power source, the carriage often stops at an intermediate points between the stators. Such carriage can not be started even when the stators are reenergized, thus requiring a long time to resume the normal state. Consequently the stopped carriage is moved by another carriage when the power source resumes its normal condition or moved by man power to the position of a stator. These methods require time and cost for bringing the carriage to a start position.

According to another prior art technique, the entire conveyance path is inclined with respect to the horizontal or curved in the form of a sine curve or similar curves in the vertical direction for automatically bringing back the carriage by its own weight to the position of the stator as disclosed in Japanese Utility Model Publication No. 34541/1984 (Japanese Utility Model Application No. 105845/1976). With this method, however, it is difficult to design and install the conveyance path. Moreover, the position of the carriage which has stopped during running cannot be determined without relying upon troublesome processings.

SUMMARY OF THE INVENTION

Accordingly, it is an object of this invention to provide an improved conveyor system capable of stopping a carriage at a position where the carriage can readily start without loss of time and requiring man power, and can simplify the design and installation of the conveyance path.

According to this invention, there is provided a conveyor system for running a carriage along a conveyance path comprising a main power source for driving the carriage, an auxiliary power source for driving the carriage when the main power source becomes faulty, a plurality of spaced apart drive means disposed along the conveyance path for imparting a forward propelling force or a reverse propelling force to the carriage by using the main power source or the auxiliary power source, means for detecting an abnormal condition of the main power source, transfer means responsive to an abnormal signal outputted by the abnormal condition detecting means for switching a drive source from the main power source to the auxiliary power source, position detecting means for detecting a position of the carriage running along the conveyance path, first control means which when the abnormal signal is outputted, selects the drive means based on the output of the position detecting means so as to drive the drive means from the auxiliary power source thereby running the carriage to the position of the drive means, and second control means for stopping the carriage at a position of a predetermined one of the drive means driven by the first control means by actuating a predetermined one of the drive means by using the auxiliary power source.

According to a modified embodiment there is provided a conveyor system for running a carriage along a conveyance path comprising:

a main power source for running the carriage;

an auxiliary source for running the carriage when the power source becomes faulty;

a plurality of spaced apart drive means installed along the conveyance path for imparting a forward or reverse propelling force to the carriage by using the main power source or the auxiliary source;

detecting means for detecting an abnormal condition of the main power source;

transfer means responsive to an output signal of the abnormal detecting means for switching a power source for the plurality of drive means from the main source to the auxiliary power source;

position detecting means for detecting a position of the carriage on the conveyance path;

control means responsive to an output of the abnormal detecting means for selecting one of the drive means in accordance with an output of the position detecting means for controlling the selected drive means for stopping the carriage at a position of a predetermined drive means.

According to another modification there is provided a conveyor system for running a carriage along a conveyance path comprising:

a main power source for running the carriage;

an auxiliary power source for running the carriage when the main power source becomes faulty;

a plurality of spaced drive means installed along the conveyance path for imparting a forward propelling force or a reverse propelling force to the carriage by using the main power source or the auxiliary power source;

means for detecting an abnormal condition of the main power source;

transfer means responsive to an output of the abnormal condition detecting means for switching a power source from the main power source to the auxiliary power source;

position detecting means for detecting a position of the carriage on the conveyance path;

control means responsive to an output of the abnormal detecting means for selecting one of the driving means based on an output of the position detecting means for running the carriage to the selected drive means; and mechanical clamping means provided for some of the drive means for holding the carriage at stopped position on the drive means.

According to still another modification there is provided a conveyor system for running a carriage along a conveyance path comprising:

a main power source for running the carriage;

an auxiliary power source for running the carriage when the main power source becomes faulty;

a plurality of spaced apart drive means disposed along the conveyance path for imparting a forward propelling force or a reverse propelling force to the carriage by utilizing the main power source or the auxiliary power source;

means for detecting an abnormal condition of the main power source;

transfer means responsive to an output of the abnormal condition detecting means for switching a power source from the main power source to the auxiliary power source;

position detecting means for detecting a position of the carriage on the conveyance path;

a first control means responsive to an output of the abnormal detecting means for selecting one of the drive means for actuating the same by using the auxiliary power source thereby causing the carriage to run to the selected drive means;

second control means for actuating the selected drive means by using the auxiliary power source so as to stop the carriage runned by the first control means at the selected drive means; and mechanical clamping means provided for the drive means for clamping the carriage at a stop position of the selected drive means.

BRIEF DESCRIPTION OF THE DRAWINGS

In the accompanying drawings.

DESCRIPTION OF THE PREFERRED EMBODIMETNS

Figure 1:
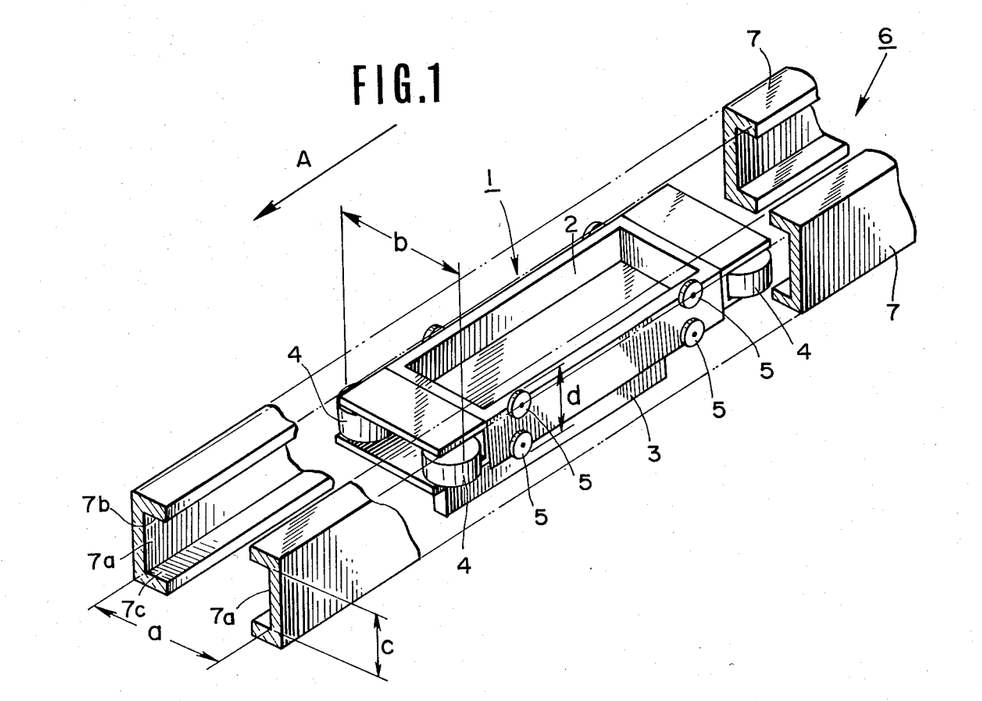
FIG. 1 is a perspective view showing one example of a carriage and guide rails.
Figure 2:
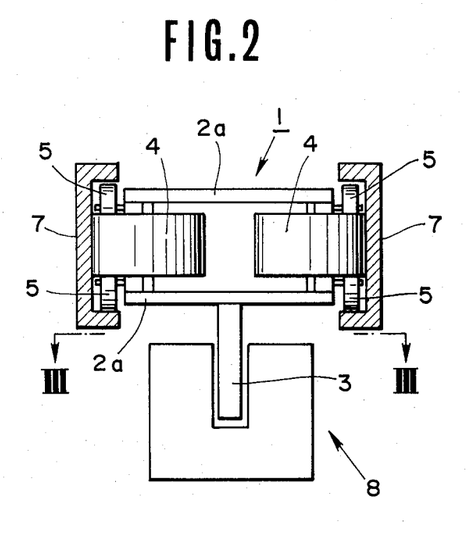
FIG. 2 is a cross-sectional view showing the conveyance path of a carriage.
Figure 3:
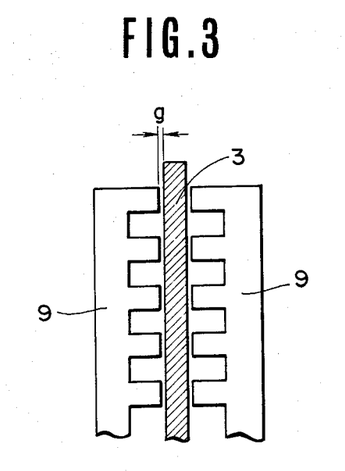
FIG. 3 is a sectional view taken along a line III—III in FIG. 2.
Figure 4A:
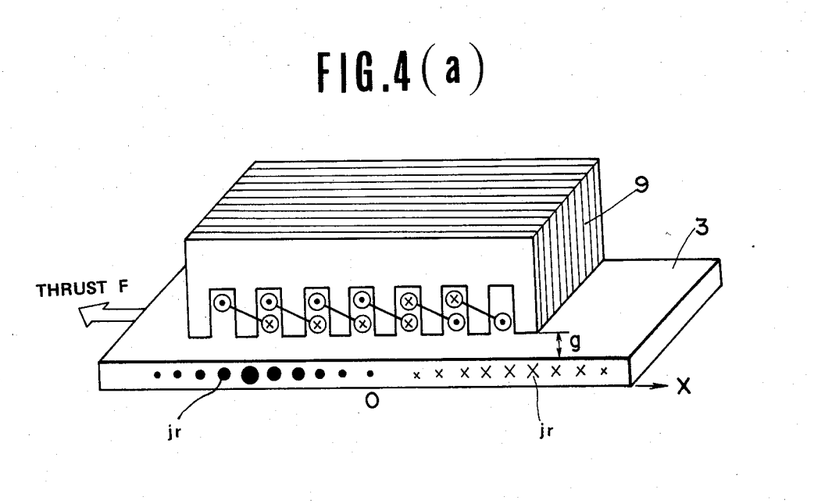
FIG. 4a is a perspective view showing a linear induction motor.

FIGS. 1-3 show one embodiment of this invention as applied to a conveying system utilizing a linear induction motor. As shown in FIGS. 1 and 2, a carriage 1 adapted to convey articles comprises a rectangular casing 1 and vertical reaction plate 2 secured to the bottom of the casing 1. The reaction plate is a metal plate made of copper or aluminum for inducing therein eddy current in accordance with a stator 9 to be described later for generating a propelling force or a reverse propelling force. Four wheels 4 and 5 projecting beyond the width of the casing are provided at the front and rear ends of the carriage. Four pairs of vertically aligned guide wheels 5 are secured to both sides of the casing 1. The conveying path 6 for the carriage 1 comprises a pair of opposed U shaped guide rails 7. The distance a between opposing inner surface 7a of the guide rails 7 is slightly longer than the distance b between the outer peripheries of the opposing wheels 4. The distance c between the upper and lower flanges 7b and 7c of each guide rail 7 is slightly larger than the distance d between the upper and lower peripheries of each pair of wheels 5. The surfaces 7a, 7b and 7c of each guide rail 7 respectively act as guide surfaces for the wheels 4 and 5. Beneath the conveyance path 6 is disposed a linear induction motor 8 as shown in FIG. 2 which comprises a movable reaction plate 3 secured to the bottom of the casing 1 and a pair of stators 9 on the opposite sides of the reaction plate 3. Each stator 9 comprises a lamination of slotted electric iron sheets, and coils are wound in the slot as shown in FIGS. 3 and 4a. A constant width air gap g is formed between each side of the reaction plate and each stator 9 as shown in FIG. 3.

Figure 4B:
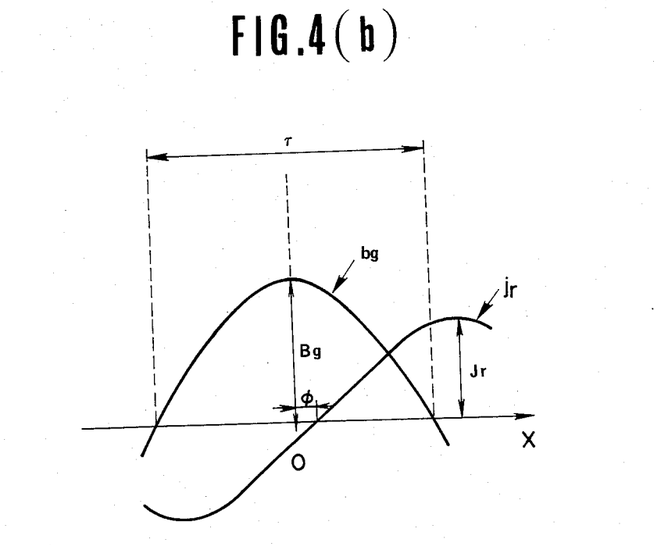
FIG. 4b is a graph showing the relationship between magnetic flux and eddy current useful to explain the principle of operation of the linear induction motor shown in FIG. 4.

The principle of generating a forward propelling force or a reverse propelling force by the linear induction motor will now be described briefly with reference to FIGS. 4a and 4b. FIG. 4a is a diagrammatic perspective view showing a flat plate one side type linear induction motor, and FIG. 4b is a graph showing the relation between magentic flux bg and eddy current jr, when two or three phase current is passed through the coils of the stator 9, the instant value bg(t) of the flux density in the gap is expressed by $$bg = Bg \; cos(wt - \pi x/\tau)$$

where
Bg: the crest value of the flux density
$w = 2\pi f$: angular frequency of the source (rad/sec.)
f: frequency (Hz)
t: time (sec.)
x: distance (m) along the stator surface
$\tau$: pole pitch (w)

The pole pitch $\tau$ means the length of one half period of the flux density. Since the magnetic flux generated by the stator 9 alternates, eddy current is induced in the reaction plate by Lenz's law. Symbols ● and X shown in the section of the reaction plate shown in FIG. 4a show the direction of flow of the eddy current and its magnitude. The instantaneous value jr of the eddy current is expressed by $$jr = Jr \sin(wt - \pi x/\tau - \phi)$$

where Jr represents the crest value of the eddy current, and a phase difference caused by the impedance of the reaction plate 3. Since the magnetic field in the gap is shifting field, the product of the flux density bg and the eddy current jr produces a continuous thrust F according to the Fleming's lefthand law. Although the thrust is generated either in left or rightward direction as viewed in FIG. 4a, in this case, since the bgXjr in a region to the left of a point O in FIG. 4b is larger than that in a region to the right, the reaction plate 3 would be moved to the left. To impart a reverse propelling force to the reaction plate 3, an opposite phase alternating current is passed through the coils of the stator 9. The magnitude of the thrust F can be varied by varying the frequency f or the amplitude of the alternating current.

The first embodiment of the conveyor system wherein the propelling force is imparted to a carriage in a manner as above described will be described with reference to FIGS. 5-8.

Figure 5:
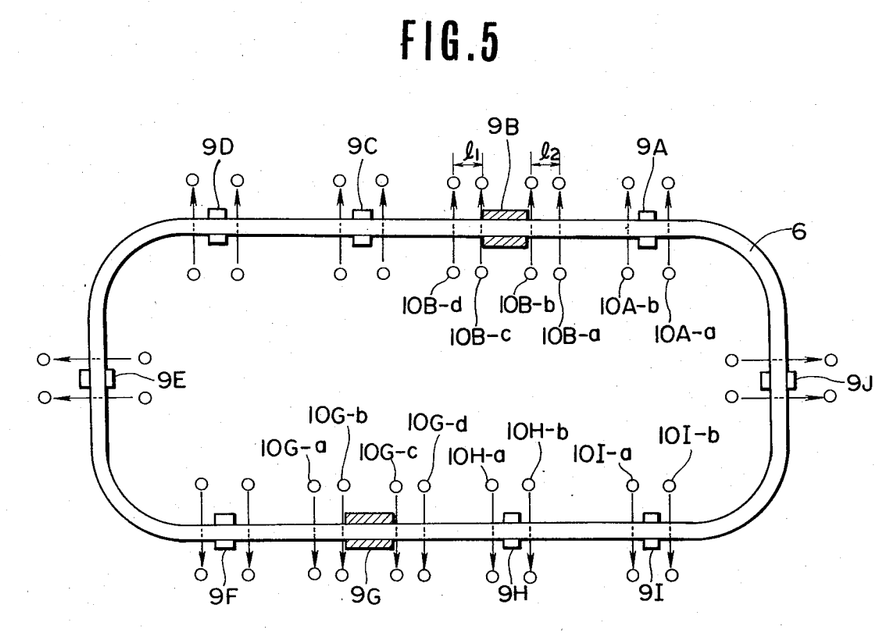
FIG. 5 is a diagrammatic representation showing a first embodiment of the conveyance path according to this invention.

As shown in FIG. 5, in this embodiment, the conveyance path 6 takes the form of a track and a plurality of stators 9A through 9J are disposed along the track at predetermined spacings. Of the plurality of stators 9A through 9J, only 9B and 9G are used as stations where the carriage 1 starts and stops, while other stators act to accelerate or decelerate the carriage 1.

Just before and after the stators 9A through 9J are provided carriage detectors 10 (10A-a, 10A-b, . . . ) for detecting the carriage 1 passing by the stators. Each detector 10 is constituted by a luminous element and a light receiving element disposed on the opposite sides of the conveyance path 6. Detectors 10 are provided on both sides of each stator so that the carriage 1 can be detected whether it is conveyed in the clockwise direction or counterclockwise direction. Especially, for stations 9B and 9G are provided two detectors 10 on each side of these stations for detecting the running speed of the carriage when it passes through the detectors. For example, when the carriage is runned clockwisely, the speed $v_1 = l_1/t_1$ of the carriage before it enters into the station 9B is detected, where $t_1$ represents the time between the detections of the carriage by detectors 10B-d and 10B-c, and $l_1$ the distance between these detectors, and the speed $v_2 = l_2/t_2$ of the carriage 1 after starting the station 9B can be calculated from a time $t_2$ between detections of the carriage 1 by detectors 10Ba and 10B-a and the distance $l_2$ between these two detectors. In the same manner, the running speed of the carriage before and after the station 9G can be measured. The speeds of the carriage thus measured are used to calculate the value of a reverse thrust necessary to precisely stop the carriage at stations 9B and 9G. The principle of calculating the reverse thrust is disclosed in the copending Japanese Patent Application No. 58853/1984. More particularly, the following equation holds according to the law of preserving momentum.

$$mv_1 - Ft = mV_2 \quad (1)$$

where
m: mass of the carriage 1
$V_1$: speed of the carriage before passing through the first stator
$V_2$: speed of the carriage before passing through the second stator
F: forward or reverse propelling force applied to the carriage by the first stator
t: time Since the speeds $V_1$ and $V_2$ can be measured by the methods described above, and since the momentum Ft is known, the mass m of the carriage can be determined with equation (1).

By using this mass, the energy of motion E of the carriage at the time of entering the second stator or station can be calculated according to the following equation.

$$E = \tfrac{1}{2}mv_2^2$$

Based on this value, it is possible to calculate a predetermined propelling force necessary to precisely decelerate and stop the carriage at the second station.

In this embodiment, the reverse propelling force necessary to stop the carriage at the stations 9B and 9G can be calculated based on the principle just described. For example, when it is desired to stop the carriage at station 9B which has started at station 9G to run in the clockwise direction, the speed e immediately after starting is measured by the detectors 10G-a and 10G-b and substituting $V_1 = 0$, $V_2 = e$ and Ft = the momentum applied to the carriage at station 9G in equation (1), for calculating the mass of the carriage. Then based on this mass m and the speed of the carriage before entering into the station 9B measured by detectors 10B-d and 10B-c, the reverse propelling force necessary to stop the carriage at the station 9B is calculated.

Figure 6:
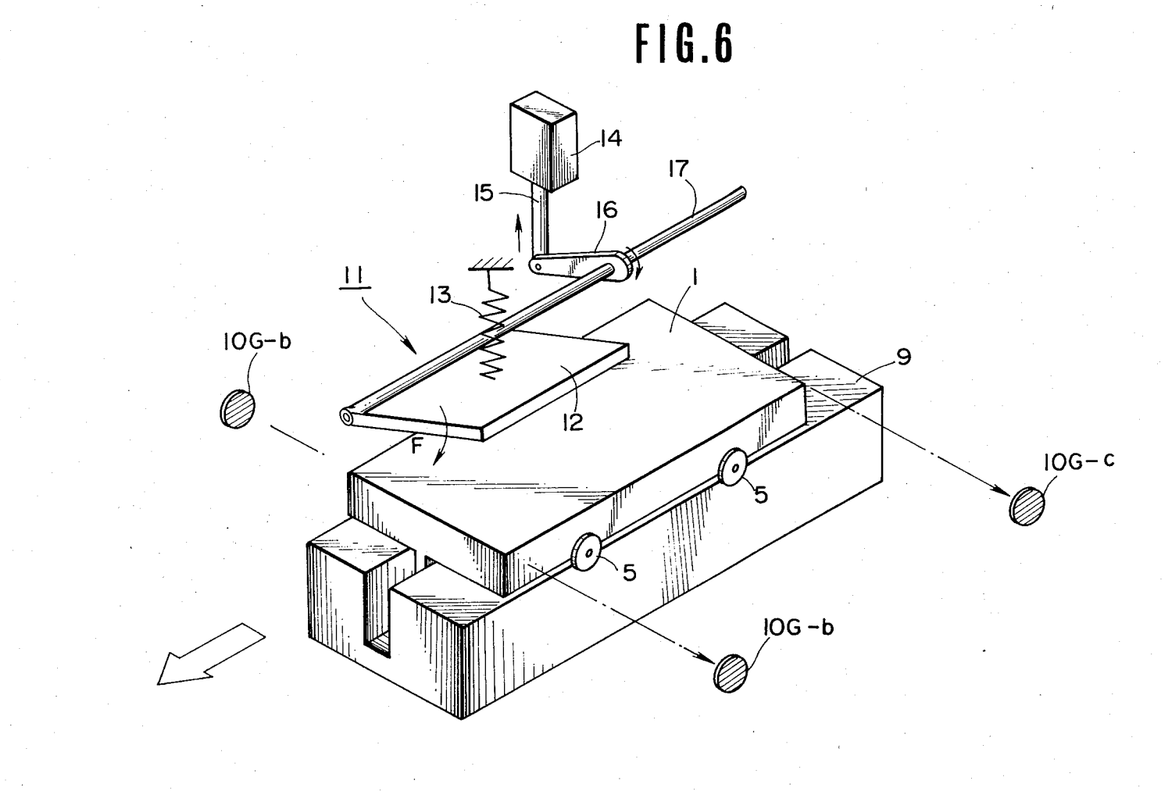
FIG. 6 is a perspective view of a clamping plate utilized in this invention.

Although it is possible to precisely stop the carriage at stations 9B and 9G with such propelling force control method, in this embodiment, for more precisely stopping the carriage at predetermined positions in the stations 9B and 9G, a clamping mechanism 11 as shown in FIG. 6 is provided for each station so as to stop the carriage also by mechanical means.

As shown in FIG. 6, the clamping plate 12 is normally held by a spring 13 away from the carriage 1. When the carriage 1 is to be stopped, a solenoid coil 14 is energized to pull upwardly a plunger 15 for rotating a lever 16 and a shaft 17 secured thereto in a direction of an arrow. Rotation of the shaft 17 rotates the clamping plate 12 in the direction of arrow F, whereby the plate 12 is urged against the carriage 1 to stop the same.

Figure 7:
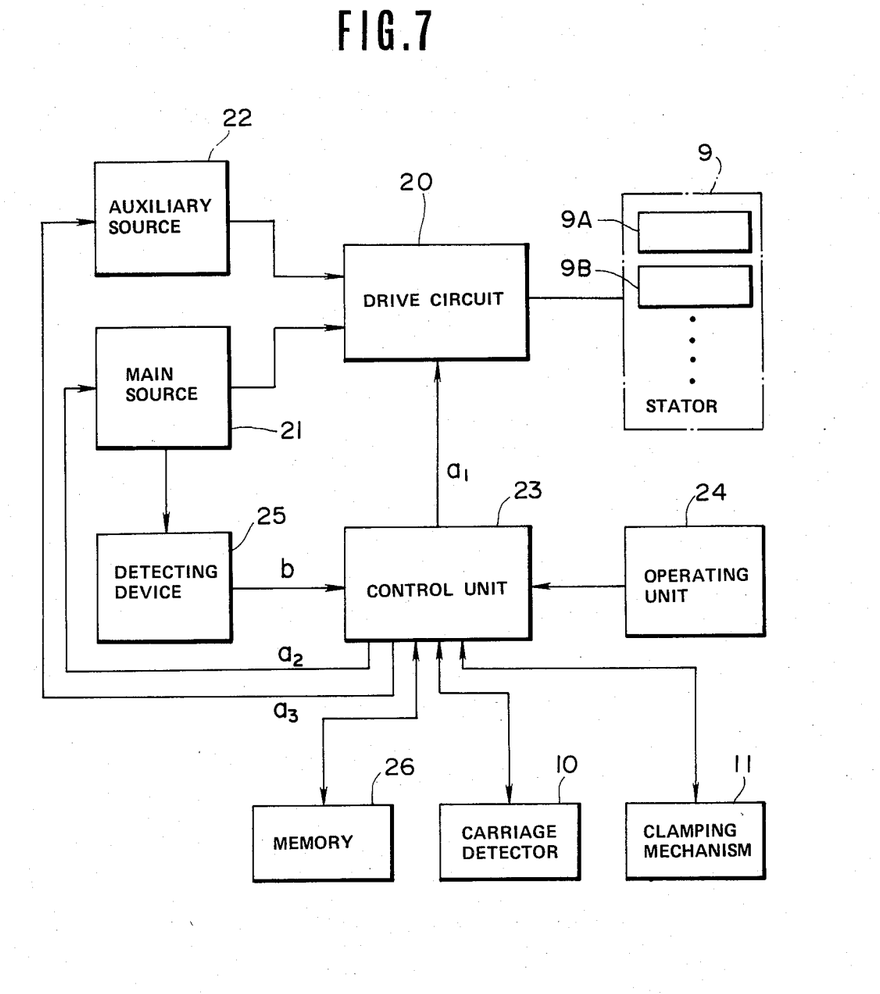
FIG. 7 is a block diagram showing a control system utilized in this invention.

Driving apparatus for stators 9A through 9J will now be described with reference to FIG. 7. A drive circuit 20 connected to each stator, for example 9, drives the stator 9 at a predetermined timing for generating predetermined forward or reverse propelling force. The drive circuit 20 is connected to a main source 21, an auxiliary source 22 and a control unit 23 for applying two or three phase alternating current from either one of the main and the auxiliary sources 21 and 22. Furthermore, the drive circuit 20 supplies the alternating current to one of the stators 9 selected by a control signal $a_1$ issued from the control unit 23. Although not shown, the drive circuit 20 includes such frequency converting means as an inverter for changing the frequency of the alternating current in accordance with the control signal $a_1$ for varying the magnitude of the thrusts generated by respective stators 9. The drive circuit 20 is provided with switching means for switching the input terminals of the stator coils supplied with the two or three phase alternating current for causing the stators 9 to generate forward or reverse propelling force. The control unit 23 is supplied with information for generating the control signal a₁ from an operating unit 24. The operating unit 24 is operated by a person who uses the carriage 1 and is supplied with information regarding the start and stop positions of the carriage. In this embodiment, the start and stop positions are limited to either one of the stations 9B and 9G. In addition to the control of the drive circuit 20, the control unit 23 controls the switching between the main and auxiliary sources 21 and 22. More particularly, the drive circuit 20 is connected to both the main and auxiliary sources 21 and 22, but under normal state, the main source 21 is used by the control signal a₁ from the control unit 23. A detecting device 25 is connected to the main source 21 to detect whether the main source is normal or abnormal state (interruption of power supply or decrease of the output caused by a fault). The output signal b from the detecting device 25 is supplied to the control unit 23. In response to the output signal b, when the control unit 23 detects that the main source 21 is in an abnormal state, it turns OFF the main source 21 by using a control signal $a_2$ while turning ON the auxiliary source 22 by the control signal $a_1$, thus effecting the switching of the sources.

A memory device 26 connected to the control unit 23 prestores information concerning the conveyance path shown in FIG. 5, that is, arrangement information of stators 9A through 9J, and arrangement information of respective carriage detectors (10A-a, 10A-b, 10B-a, ...). The memory device 26 is also inputted with a start position information and a stop position information inputted from the operating unit 24 via control unit 23. The carriage detectors 10A-a, 10A-b, 10B-a are disposed before and after respective stators are connected to the control unit 23 for receiving the detection signals from respective detectors. The control unit 23 calculates the speed and mass of the carriage based on the detection signals by the methods described above, thereby producing the reverse propelling force for stopping the carriage 1 in accordance with the calculated values. The clamping mechanisms 11 at the stations 9B and 9G are electrically connected to the control unit 23 whereby the clamping mechanisms 11 are controlled by the control unit 23.

The operation of the first embodiment will be described with reference to FIGS. 5-8.

At first the operator operates the operating unit 24 for inputting informations regarding the starting position and the stopping position of the carriage 1, and then depresses a start switch, not shown. It is assumed now that the carriage 1 starts at station 9B and stops at station 9G and that the carriage 1 runs in the clockwise direction. Upon depression of the start switch, the control unit 23 turns ON the main source 21 by the control signal $a_2$. Furthermore, based on the start position information and the stop position information, the control unit 23 determines timings for driving stators 9A through 9H, selection of producing the forward propelling force or the reverse propelling force and the magnitudes of these propelling forces according to a predetermined program and controls the drive circuit 20 according to the control signal $a_1$. The drive circuit 20 passes 2 or 3 phase alternating current through desired stator coils for producing magnetic flux which induces eddy current in the reaction plate 3, the product of the magnetic flux and the eddy current producing continuous forward or reverse propelling force according to Flemings lefthand law, thereby running the carriage 1 from the start station 9B and precisely stopping the carriage at station 9G.

When the main source 21 becomes faulty, the system operates as follows. At the time of interruption of the power supply or when the main source 21 becomes faulty, the output of the main source 21 would decrease or turn OFF. When such abnormal condition occurs during the running of the carriage 1, the carriage can not be runned in a system having only the main source 21. As a consequence, the stop position of the carriage is determined by its inertia at the time of occurrence of the abnormal condition and the friction resisting the inertia. Accordingly, it is not only impossible to stop the carriage at a desired position but also the carriage stops at a position intermediate of adjacent stators thus disenabling next starting.

To solve this problem according to this embodiment, upon occurrence of an abnormal condition, the source is transferred to the auxiliary source 22 so as to run the carriage 1 to a terminal station (in this case stator 9G and then stop the carriage by utilizing the auxiliary source 22. The abnormal condition of the main source 21 is detected by the detecting device 25, the output signal b thereof being supplied to the control unit (at step 100 shown in FIG. 8). In response to the output signal b the control unit 23 turns OFF the main source 21 and immediately after that turns ON the auxiliary source 22 for supplying alternating current to the drive circuit 20 from the auxiliary source 22 thus effecting the transfer of the sources (see step 101). After that the carriage is run until stopped by the energy supplied from the auxiliary source 22.

Figure 8:
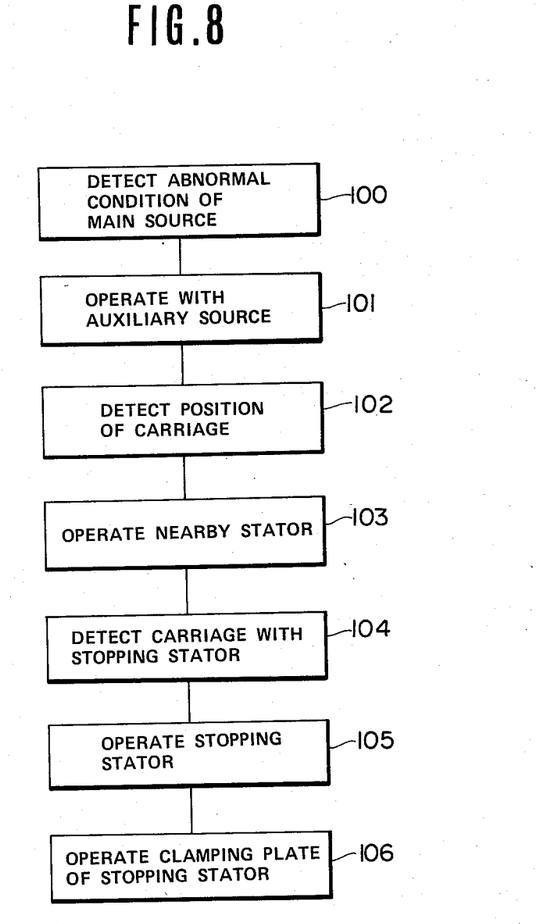
FIG. 8 is a flow chart for explaining the operation of the first embodiment.

After transferring the source to the auxiliary source 22, the control unit 23 detects the runned position of the carriage 1 in accordance with the signals detected by respective carriage detectors 10 (see step 102). For example, let us assume that the carriage 1 which has started from the station 9B is firstly detected by detector 101-a of stator 9I after the main souce 21 become faulty. As has been pointed out hereinabove, the memory device 26 prestores informations regarding respective stators 9 of the conveyance path 6, and arrangement of respective detectors 10 so that by recognizing these informations, the control unit 23 applies the control signal $a_1$ to the drive circuit 20 when the detector 10H-b detects the carriage for driving stator 9H (see step 103) at this time the stator 9H inparts a reverse propelling force to the carriage 1 so as to decelerate the same to some extent. More particularly, in this case, since a stator next to stator 9H is the station 9G at which the carriage is to be stopped, the control unit 23 decelerates the carriage to some extent at the stator 2H.

After that the carriage 1 is conveyed to the station 9G after sequentially passing through detectors 10H-a, 10G-d and 10G-c (see step 104). Based on the signals detected by detectors 10G-d and 10G-c, the control unit 23 calculates the running speed of the carriage when it enters into the station 9G and then calculates the deceleration energy to be applied at station 9G necessary to stop the carriage in accordance with the calculated value and the mass m of the carriage already determined by the method described above. As above described, the control unit 23 applies the calculated deceleration energy to the stator 9G via the drive circuit 20 thereby stopping the carriage at the station 9G (see step 105). When the leading edge of the carriage 1 is detected thereafter by the detector 10G-b, the controller 23 energizes solenoid coil 14 to urge the clamping plate 12 against the carriage 1 thereby securely holding the same at a predetermined position of the station 9G (see step 106). When the main source 21 restores thereafter, the restoration is detected by the detecting device 25 and a detection signal b is applied to the control unit 23. After transferring the source from the auxilary source 22 to the main source 21, the solenoid coil 14 of the clamping mechanism is deenergized with the result that the clamping plate 12 is retracted from the conveyance path 6 by the force of spring 13 thereby enabling the reruning of the carriage 1.

In this embodiment, after switching to the auxiliary source 22, the control unit 23 has controlled the carriage until it reaches the desired stop position. Alternatively, it is also possible to run and stop the carriage until it reaches a start position (in this case station 9B) and restart the carriage from the start position when the fault of the source has repaired or the supply of power is resumed.

With this control, even when an abnormality occurs, the carriage can stop at the start position before occurrence of the abnormal thus making definite the destination of the carriage. Accordingly, when the abnormal condition is cleared, the operator can issue a running instruction to the carriage without any pause.

According to the embodiment, after the main source 21 becomes faulty, where the carriage 1 is detected at a stator remote from the desired stop position, respective stators accelerate the carriage until it reaches a point near the desired stop point so as to prevent the stopping of the carriage, and when the carriage approaches the desired stop position, it is decelerated to stop. After the main source 21 becomes faulty, when the carriage is firstly detected by a carriage detector installed immediately prior to the desired stop position only the stator at the desired stop point decelerates the carriage to stop it at the desired stop position.

The clamping mechanism 11 provided for the stations 9B and 9G of this embodiment is not always necessary. In other words, so long as the deceleration and stopping energy supplied to the drive circuit 20 of each stator is adequately controlled, the carriage can be stopped only with the braking force applied by the stator.

The speed detecting means comprising two carriage detectors provided before and after each of the stators 9B and 9B is not always necessary. In other words, the carriage can be stopped at a stator only with the clamping mechanism 11 provided for stators 9B and 9G respectively. In this case, when the detecting device 25 detects the abnormal condition of the main source 21, the control unit 23 actuates the clamping mechanism 11 at a predetermined timing in accordance with the position detection of the carriage to project the clamping plate 12 on the conveyance path thereby forcibly stopping the carriage at the stator 9G or 9B.

Figure 9:
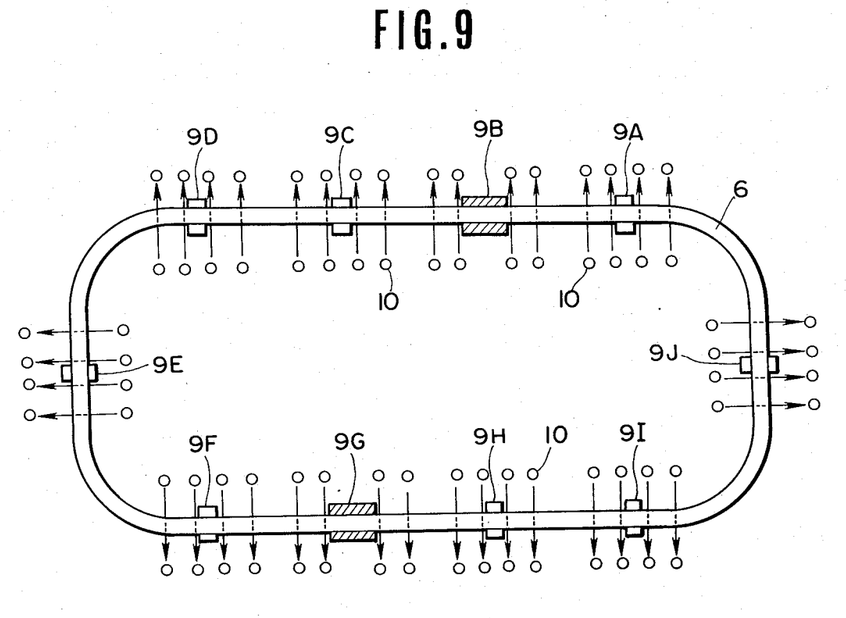
FIG. 9 is a diagrammatic representation showing a second embodiment of the conveyance path constructed according to the teaching of this invention.
Figure 10:
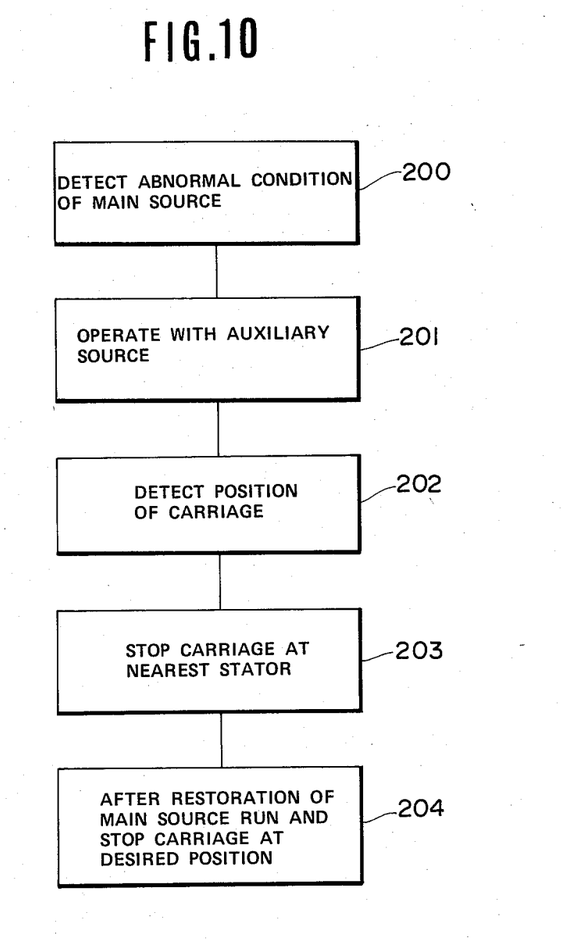
FIG. 10. is a flow chart useful to explain the operation of the second embodiment.

The second embodiment of this invention will now be described with reference to FIGS. 9 and 10. As shown in FIG. 9, two carriage detectors 10 are installed before and after of each of the stators 9A through 9I for detecting the running speed of the carriage before and after of each stator. More particularly, in this embodiment, the carriage can stop not only at the stations 9B and 9B but also at all other stations. According to this embodiment, when the main source 21 becomes faulty, respective stators are controlled such that the carriage 1 can be stopped in a shortest time. Since it is desirable to minimize the power consumption of the auxiliary source 22 after the source has been switched to the auxiliary source 22, the position of the carriage is detected (at step 202 shown in FIG. 10), and the carriage is stopped at a stator position closest in the direction of conveyance in response to a detected signal (at step 203). After extinguishing the abnormal condition, the carriage is runned to the desired stop position by the main source 21 (see step 204).

Figure 11:
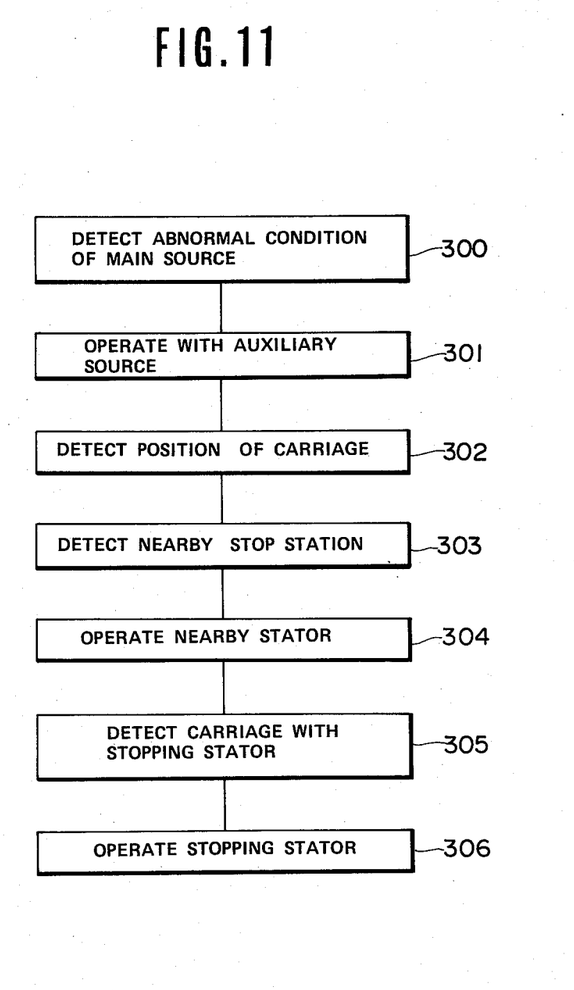
FIG. 11 is a flow chart useful to explain the operation of another embodiment of this invention.

In this embodiment, the clamping mechanism 11 can be provided for all stators so as to stop the carriage by the braking force exerted by the stator and the clamping force applied by the clamping mechanism at all stators 9A through 9J. In this embodiment where the running speed of the carriage is low, although it is possible to stop the carriage without applying shock at stator 9 through which the carriage passes firstly, but where the speed is high it is advantageous to stepwisely decelerate the carriage with a plurality of stators.

Where the main source 21 becomes faulty, as shown in FIG. 11, after switching the source to the auxiliary source 22 (see step 301), the position of the carriage 1 is detected by using the outputs of the carriage detectors 10 installed before and after respective stators (at step 302), and one of the stations 9B and 9G closer to the carriage is selected based on the detector output (at step 303) and the carriage is runned and stopped toward the selected station (steps 304-306). In this case, the carriage can run in the opposite direction. For example, where a carriage running in the clockwise direction is detected by stators 9A and 9J the carriage is runned in the opposite direction to be stopped at station 9B. Where the carriage is detected by stators 9I and 9H, the carriage is runned as it is to stop at station 9G. In this embodiment, two carriage detectors are installed before and after each of the stators 9A through 9J to enable detection of the running speed of the carriage at all stator positions so that it is easy to impart a reverse propelling force for running the carriage in the reverse direction at each stator.

Figure 12:
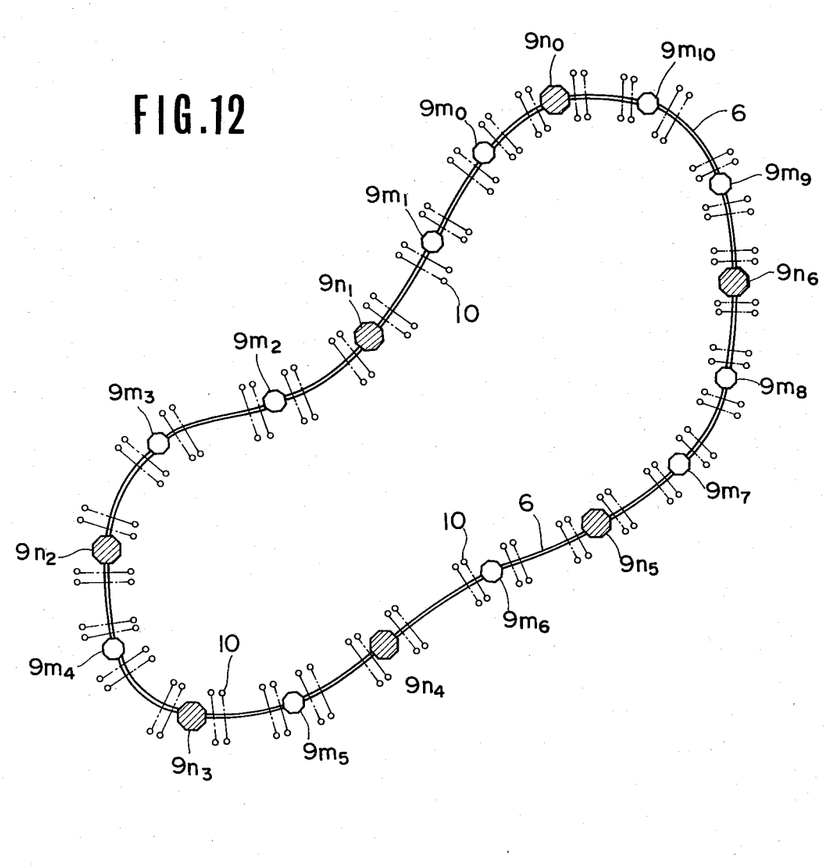
FIG. 12 is a diagrammatic representation showing the conveyance path of still another embodiment of this invention.

FIG. 12 shows still another embodiment of this invention in which in addition to a plurality of stations $9n_0$ through $9n_6$ along $9n_6$ performing normal starting and stopping, a plurality of stators $9m_0$–$9m_{10}$ performing only acceleration and deceleration are installed between stations $9n_0$ through $-9n_6$ along the conveyance path 6. Two carriage detectors 10 are provided before and after each of the stations $9n_0$–$9n_6$ and stators $9m_0$–$9m_{10}$ so as to measure the running speed of the carriage before and after each station and stator.

In this embodiment, before starting the carriage, the operator operates the operating unit (see FIG. 7) to designate the starting position and the stopping position of the carriage at the plurality of stations $9n_0$–$9n_6$. The starting position and the stopping position of the carriage is stored in the memory device 26 through control unit 23. For this reason, in this embodiment too including a plurality of stations, even when the main source 21 becomes faulty, just like the first embodiment, it is possible to run and stop the carriage to the first start position and the first desired stop position by using the energy of the auxiliary source 22.

Like the second embodiment, in this embodiment too, when the main source 21 becomes faulty, the carriage can be stopped at a nearest stator, that is station.

According to the embodiments described above, when the main source 21 becomes faulty it is switched to the auxiliary source 22 to continuously run the carriage, whereby even at the time of interruption of power supply, the carriage 1 can be run and stopped as desired.

It should be understood that the invention is not limited to the specifically illustrated embodiments and that various changes and modifications will be obvious to one skilled in the art without departing the spirit and scope of the invention as defined in the appended claims. For example, the conveyance path is not limited to a loop and can take many other configurations. The detecting device for detecting the carriage is not limited to a combination of a light projector or a luminous element and a light receiving element. Other suitable type detector, for example an electromagnetic type detector may be used. Any suitable mechanism for stationary holding the carriage at the stator or station other than the illustrated clamping mechanic can be used.

Although in the foregoing embodiments, a linear induction motor was used as means for imparting forward or reverse propelling force to the carriage, other types of linear motors, for example a linear step motor, and a linear direct motor can also be used. Any carriage or vehicle capable of continuing running after once driven by linear drive means can enjoy the benefit of this invention. Instead of using electric power, pneumatic actuators driven by an air compressor can be used.

What is claimed is:

1. A conveyor system for running a carriage (1) by utilizing the inertia thereof along a conveyance path (6) comprising:
   a main power source (21) for driving said carriage;
   an auxiliary power source (22) for driving said carriage when said main power source becomes faulty;
   a plurality of spaced apart drive means (9) disposed along said conveyance path for imparting a forward propelling force or a reverse propelling force to said carriage by using said main power source or said auxiliary power source;
   means (25) for detecting an abnormal condition of said main power source;
   transfer means (23) responsive to an abnormal signal outputted by said abnormal condition detecting means for switching a drive source from said main power source to said auxiliary power source
   position detecting means (10) for detecting a position of said carriage running along said conveyance path;
   first control means (20, 23) which, when said abnormal signal is outputted, selects said drive means based on an output of said position detecting means so as to drive said drive means from said auxiliary power source thereby running said carriage to a position of said drive means, and
   second control means for stopping said carriage at a position of a predetermined one of said drive means driven by said first control means by actuating a predetermined one of said drive means by using said auxiliary power source.

2. The conveyor system according to claim 1 wherein said carriage comprises a reaction member, and each of said drive means comprises a linear motor acting upon said reaction member for imparting said forward or reverse propelling force to said carriage.

3. The conveyor system according to claim 1 which further comprises memory means for storing a starting position of said carriage, and wherein said first control means controls said drive means for causing said carriage to run to said start position stored in said memory means when said main power source is in an abnormal state, and said second control means controls one of said drive means corresponding to said start position thereby stopping said carriage at said start position.

4. The conveyor system according to claim 1 which further comprises memory means for storing a destination position of said carriage and wherein said first control means controls one of said drive means for running said carriage to said destination position and said second control means controls one of said drive means corresponding to said destination position for stopping said carriage at said destination position.

5. The conveyor system according to claim 1 wherein said first control means controls said drive means such that said carriage is runned to one of said drive means located closest to a position at which said carriage is detected when said main power source becomes faulty and wherein said second control means controls said drive means for stopping said carriage at one of said drive means closest to said carriage.

6. The conveyor system according to claim 1 wherein said first control means controls said drive means so as to cause said carriage to run to one of said drive means closest to a position at which said carriage is detected when said main source becomes faulty and wherein said second control means controls said control means for stopping said carriage at one of said drive means located closest to said carriage.

7. The conveyor system according to claim 1 wherein some of said plurality of drive means are used to start and stop said carriage while the other drive means are used to accelerate and decelerate said carriage, and wherein said first and second control means controls said drive means so as to run and stop said carriage to either one of said drive means at which said carriage is started and stopped.

8. The conveyor system according to claim 1 which further comprises detecting means (10, 23) for detecting kinetic energy of a running carriage and wherein said second control means controls one of said drive means such that a negative kinetic energy determined in accordance with an output of said kinetic energy detecting means is applied to said carriage, thus stopping the same when an abnormal detection signal is outputted.

9. A conveyor system for running a carriage (1) by utilizing the inertia thereof along a conveyance path (6) comprising:
   a main power source (21) for running said carriage;
   an auxiliary source (22) for running said carriage when said main power source becomes faulty;
   a plurality of spaced apart drive means installed along said conveyance path for imparting a forward or reverse propelling force to said carriage by using said main power source or said auxiliary source;
   detecting means (25) for detecting an abnormal condition of said main power source;
   transfer means (23) responsive to an output signal of said abnormal detecting means for switching a power source for said plurality of drive means from said main source to said auxiliary power source;
   position detecting means (10) for detecting a position of said carriage on said conveyance path;
   control means responsive to an output of said abnormal detecting means for selecting one of said drive means in accordance with an output of said position detecting means for controlling said selected drive means for stopping said carriage at a position of a predetermined drive means.

10. The conveyor system according to claim 9 which further comprises means (10, 23) for detecting kinetic energy of a running carriage; and wherein said control means responses to an output of said abnormal detecting means for controlling one of said drive means for imparting a negative propelling force to said carriage in accordance with an output of said motion energy detecting means.

11. A conveyor system for running a carriage (1) by utilizing the inertia thereof along a conveyance path (6) comprising:
   a main power source (21) for running said carriage;
   an auxiliary power source (22) for running said carriage when said main power source becomes faulty;
   a plurality of spaced drive means (9) installed along said conveyance path for imparting a forward propelling force or a reverse propelling force to said carriage by using said main power source or said auxiliary power source;
   means (25) for detecting an abnormal condition of said main power source;
   transfer means (23) responsive to an output of said abnormal condition detecting means for switching a power source from said main power source to said auxiliary power source;
   position detecting means for detecting a position of said carriage on said conveyance path;
   control means (20, 23) responsive to an output of said abnormal detecting means for selecting one of said drive means based on an output of said position detecting means for running said carriage to said selected drive means, and
   mechanical clamping means (11) provided for some of said drive means for holding said carriage at stopped position on said drive means.

12. The conveyor system according to claim 11 wherein said mechanical clamping means comprises a clamping plate urged against said carriage by solenoid means.

13. The conveyor system according to claim 11 wherein said mechanical clamping means is provided for all of said plurality of drive means.

14. The conveyor system according to claim 11 wherein said mechanical clamping means is selectively provided for some of said plurality of drive means.

15. A conveyor system for running a carriage (1) along a conveyance path (16) comprising:
   a main power source (21) for running said carriage;
   an auxiliary power source (22) for running said carriage when said main power source becomes faulty;
   a plurality of spaced apart drive means (9) disposed along said conveyance path for imparting a forward propelling force or a reverse propelling force to said carriage by utilizing said main power source or said auxiliary power source;
   means (25) for detecting an abnormal condition of said main power source;
   transfer means (23) responsive to an output of said abnormal condition detecting means for switching a power source from said main power source to said auxiliary power source;
   position detecting means (10) for detecting a position of said carriage on said conveyance path;
   a first control means responsive to an output of said abnormal detecting means for selecting one of said drive means for actuating the same by using said auxiliary power source thereby causing said carriage to run to said selected drive means;
   second control means (20, 23) for actuating said selected drive means by using said auxiliary power source so as to stop said carriage runned by said first control means at said selected drive means; and
   mechanical clamping means (11) provided for said drive means for clamping said carriage at a stop position of said selected drive means.

16. The conveyor system according to claim 15 wherein said mechanical clamping means comprises a clamping plate urged against said carriage by solenoid means.

17. The conveying system according to claim 15 which further comprises kinetic energy detecting means (10,23) detecting the kinetic energy of a running carriage and wherein said second control means which when an output is produced by said abnormal detecting means controls a selected one of said drive means so as to apply a negative kinetic energy to said carriage determined by an output of said kinetic energy detecting means.

* * * * *